United States Patent [19]

Okochi et al.

[11] Patent Number: 4,976,147
[45] Date of Patent: Dec. 11, 1990

[54] DEVICE FOR MEASURING DYNAMIC BALANCE OF A ROTOR

[75] Inventors: Mikiyoshi Okochi; Tetsuo Oshiro, both of Nagoya, Japan

[73] Assignee: NGK Spark Plug Co., Ltd., Aichi, Japan

[21] Appl. No.: 362,844

[22] Filed: Jun. 7, 1989

[51] Int. Cl.⁵ .............................................. G01M 1/04
[52] U.S. Cl. .......................................... 73/455; 73/472
[58] Field of Search ................. 73/455, 460, 471, 472, 73/474

[56] References Cited

U.S. PATENT DOCUMENTS

| | | | |
|---|---|---|---|
| 2,353,150 | 7/1944 | Dietz | 73/472 |
| 4,250,756 | 2/1981 | Maus | 73/472 |
| 4,543,825 | 10/1985 | Schonfeld et al. | 73/472 |
| 4,694,689 | 9/1987 | Kawasaki | 73/460 |
| 4,716,761 | 1/1988 | Ito et al. | 73/455 |

Primary Examiner—John Chapman
Attorney, Agent, or Firm—Darby & Darby

[57] ABSTRACT

A device for measuring dynamic balance of a rotor including a shaft to which an impeller is secured at its one end and which has a neck portion adjacent to the impeller so that the shaft may be rotatably supported by a bearing member at the neck portion. The device comprises: a housing member, a thrust bearing secured to the housing member and engageable with the neck portion of the shaft, a support member provided in the housing member beneath the thrust bearing and engageable with the shaft so that the shaft may be rotatably supported in a slanted or a vertical position by the support member and the thrust bearing with the impeller being positioned upward, and a sensor connected to the housing member for detecting the vibration of the housing member caused when the rotor supported by the thrust bearing and the support member is rotated. The dynamic balance of the rotor can be measured by the sensor in terms of the vibration of the housing.

1 Claim, 3 Drawing Sheets

DEVICE FOR MEASURING DYNAMIC BALANCE OF A ROTOR

BACKGROUND OF THE INVENTION

This invention relates to a device for measuring dynamic balance of a rotor for turbochargers, gas turbines, etc.

FIG. 5 depicts an example of a turbocharger, in which the reference numeral 1 denotes a cantilever rotor composed of a shaft 2 and impellers 3 and 4 fixedly secured to opposite ends of the shaft 2. The rotor 1 is rotatably received by a pair of ball bearings 6a and 6b supported by a housing 7. The ball bearing 6a is engaged with a neck portion 5 of the shaft 2 which is formed adjacent to the impeller 3. The impeller 3 is disposed within a gas feed passage 8 while the impeller 4 is disposed within a gas exhaust passage 9.

In such a turbocharger or the like gas turbine, it is important that the rotor 2 should exhibit good dynamic balance during its rotation, since otherwise the rotation causes vibration of bearings 6a and 6b and other associated parts. Machining errors during manufacture of the impellers, shaft and other components of the rotor generally cause dynamic unbalance of the rotor.

There is known a device which can detect and evaluate the dynamic balance of such rotors. The conventional device includes a housing, two or more ball bearings secured to the housing for rotatably supporting the rotor in a substantially horizontal position, and a sensor for detecting vibration of the housing caused as a result of the rotation of the rotor supported by the bearings.

In the conventional dynamic balance measuring device, the weight of the rotor is supported in the radial direction (in the direction perpendicular to the axis of the rotor shaft) only, because the rotor shaft is maintained in a horizontal position. It has been found, however, that vibration in the thrust direction (in the direction parallel to the axis of the rotor shaft) should not be ignored in order to precisely evaluate the dynamic balance of the rotor. That is, with the conventional device, a portion of the vibration in the radial direction is relaxed as a result of the sliding of the shaft in the axial direction so that the measured value involves a measuring error which cannot be disregarded.

SUMMARY OF THE INVENTION:

It is, therefore, an object of the present invention to provide a device which can precisely measure dynamic balance of a rotor such as a cantilever rotor of a turbocharger or the like gas turbine.

Another object of the present invention is to provide a device of the above-mentioned type which is devoid of the drawback of the conventional device.

In accomplishing the foregoing object, the present invention provides a device for measuring dynamic balance of a rotor including a shaft, and an impeller secured to one end of the shaft, the shaft having a neck portion adjacent to the impeller so that the shaft may be rotatably supported by a bearing member at the neck portion, said device comprising:

a housing member;

a thrust bearing secured to said housing member and supportingly engageable with the neck portion of the shaft;

a support member provided in the housing member beneath said thrust bearing and engageable with the shaft so that the shaft may be rotatably supported in a slanted or a vertical position by said support member and said thrust bearing with the one end thereof to which the impeller is secured being positioned upward; and means connected to said housing member for detecting the vibration of said housing member, whereby when the rotor, supported by said thrust bearing and said support member, is rotated, the dynamic balance thereof can be measured by said detecting means the amount of the vibration of the housing caused by the rotation of the rotor.

Since the rotor shaft is supported in a slanted or vertical position by the thrust bearing and the support member, a vibration which results from, for example, the lack of uniformity of the diameter of the rotor shaft and which represents dynamic unbalance of the rotor can be precisely detected.

BRIEF DESCRIPTION OF THE DRAWINGS:

Other objects, features and advantages of the present invention will become apparent from the detailed description of the preferred embodiment of the invention which follows, when considered in the light of the accompanying drawings, in which.

Figure 1:
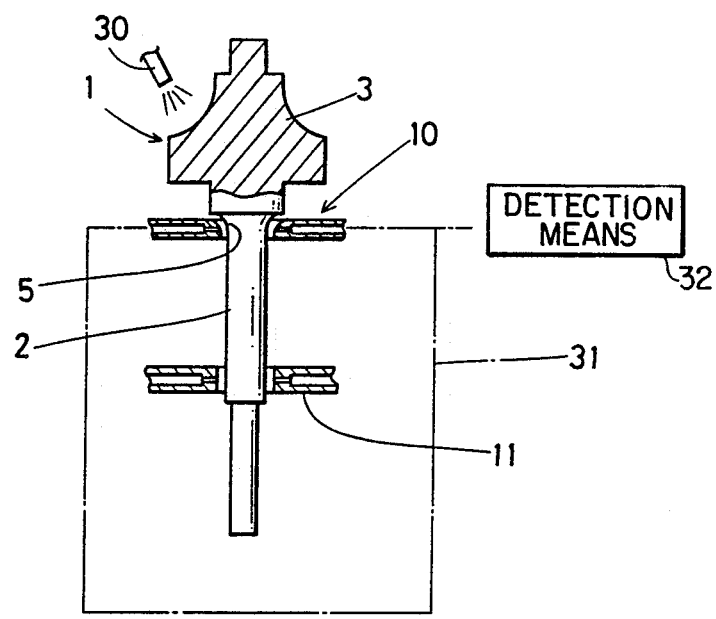
FIG. 1 is a fragmentary, cross-sectional view schematically showing one embodiment of dynamic balance measuring device according to the present invention.
Figure 5:
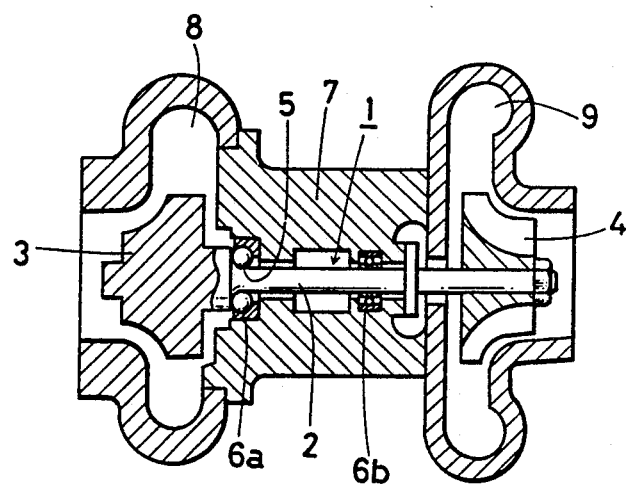
FIG. 5 is a cross-sectional view schematically showing a turbocharger having a rotor to which the present invention may be applied for the detection of the dynamic balance thereof.

DESCRIPTION OF THE PREFERRED EMBODIMENTS:

Referring now to the drawings, FIG. 1 depicts a state of a cantilever rotor 1 where it is mounted on the device of the present invention for the measurement of the dynamic balance thereof. The rotor 1 includes a shaft 2 having one end to which an impeller 3 is fixedly secured and a neck portion 5 adjacent to the impeller 3. The neck portion 5 of the rotor 1 is adapted to engage with a ball bearing of, for example a turbocharger as described previously with reference to FIG. 5.

Figure 2:
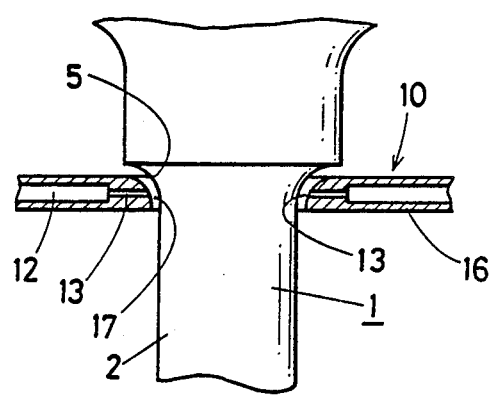
FIG. 2 is a partial, enlarged view of FIG. 1, showing a gas bearing.

The measuring device according to the present invention includes a housing 31 to which a thrust bearing 10 and a support member 11 are secured. The thrust bearing 10 and the support member 11 are vertically spaced apart from each other so as to support the rotor 1 in a substantially vertical position. As shown in FIG. 2, the thrust bearing 10 in this embodiment is a gas bearing which includes a generally annular bearing body 16, a bore 17 formed in the bearing body 16 through which the rotor shaft 2 can be inserted, and a plurality of gas injection holes 13 provided in the periphery of the bore wall and generally angularly equally spaced apart from each other. The holes 13 are in fluid communication with a gas feed passage 12 provided in the bearing body 16, which passage 12 in turn is connected to a source (not shown) of a pressurized gas so that the gas is jetted from each of the holes 13 at a high speed toward the center axis of the bore 17. The support member 11 in the illustrated embodiment, too, is a gas bearing of the above-described construction. The peripheral surface of the bore 17 of the gas bearing 10 is preferably rounded to conform to the peripheral surface of the neck portion 5 of the rotor shaft 2.

As a result of the above construction, the rotor 1 whose shaft 2 is inserted into the gas bearings 10 and 11 can be supported in position by the pressure of the jet gas streams from the bearings 10 and 11 without direct, mechanical contact therewith. More specifically, the high speed gas streams from the gas bearing 10 impinge on the neck portion 5 of the shaft 2 to support the weight of the rotor 1. That is, the rotor 1 is supported by the gas bearing 10 in the thrust direction thereof. Further, in the radial direction, the rotor 1 is supported by the gas streams from the gas bearings 10 and 11 jetted toward the center axis of the shaft 1.

As shown in FIG. 1, means 32 is connected to the housing 31 for detecting and measuring the vibration of the housing 31 caused when the rotor 1 supported by the gas bearings 10 and 11 is rotated. Such a detecting means is well known in the art and the explanation thereof is omitted here. Thus, when air is blown from a nozzle 30 toward the impeller 3 of the rotor 1 supported by the bearings 10 and 11, the rotor 1 is rotated. If, for example, the shaft diameter is not uniform, the gas bearings 10 and 11 receive reaction from non-uniform compression of the gas flows in the bearings 10 and 11 and, therefore, vibrate. The vibration of the bearings 10 and 11 is transmitted to the housing 31 and is detected by the vibration-sensing means 32.

Figure 3:
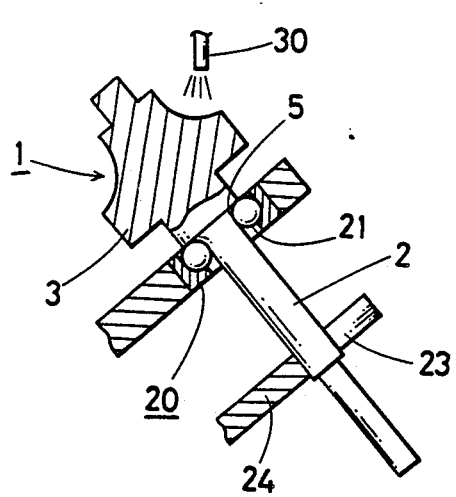
FIG. 3 is a fragmentary, cross-sectional view schematically showing another embodiment according to the present invention.
Figure 4:
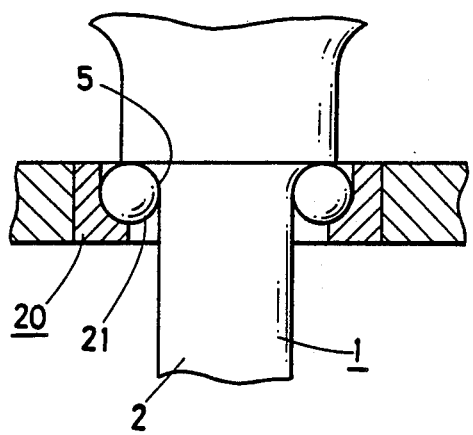
FIG. 4 is a partial, enlarged view of FIG. 3, showing a ball bearing.

FIGS. 3 and 4 illustrate another embodiment in which the rotor 1 is supported in a slanted position. The neck portion 5 of the rotor 1 is rotatably supported by a ball bearing 20 having a plurality of rollers 21 engaged with the neck portion 5. The lower portion of the shaft 2 is supported by a support member 24 having a U-shaped groove 23 having a semicircular bottom which is in supporting engagement with the shaft 2. As the support member 24, a ball bearing may be used, if desired.

The bearing 20 receives both thrust and radial loads of the rotor 1 and, thus, vibrates proportionally to the dynamic unbalance of the rotor 1, when the rotor 1 is rotated by means of an air nozzle 30. The vibration is transmitted in the same manner as in the embodiment shown in FIG. 1 to the housing (not shown) by which the bearing 20 is supported.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A device for measuring dynamic balance of a rotor including a shaft, and an impeller secured to one end of the shaft, the shaft having a neck portion adjacent to the impeller so that the shaft may be rotatably supported by a bearing member at the neck portion, said device comprising:

a housing member;
a thrust bearing secured to said housing member and supportingly engageable with the neck portion of the shaft;
a support member provided in the housing member beneath said thrust bearing and engageable with the shaft so that the shaft may be rotatably supported in a slanted or a vertical position by said support member and said thrust bearing with the one end thereof t which the impeller is secured being positioned upward;
means connected to said housing member for detecting the vibration of said housing member, whereby when the rotor, supported by said thrust bearing and said support member, is rotated, the dynamic balance thereof can be measured by said detecting means the amount of the vibration of the housing caused by the rotation of the rotor;
said thrust bearing and said support member being a pair of vertically spaced apart gas bearings, each including a bearing body supported by said housing and having a bore portion through which the shaft can be inserted, and a plurality of gas injection ports provided in the inside periphery of the bore portion for radially inwardly jetting a gas so that the rotor can be rotatably supported in a vertical position by the jet gas from said gas bearings without direct contact with said bearing bodies.

* * * * *